United States Patent
Krämer et al.

(10) Patent No.: US 11,572,935 B2
(45) Date of Patent: Feb. 7, 2023

(54) LINEAR DRIVE SYSTEM

(71) Applicant: HYDAC INTERNATIONAL GMBH, Sulzbach/Saar (DE)

(72) Inventors: Florian Benjamin Krämer, Sulzbach (DE); Felix Anton Schwarz, Saarbrücken (DE)

(73) Assignee: HYDAC INTERNATIONAL GMBH, Sulzbach/Saar (DE)

( * ) Notice: Subject to any disclaimer, the term of this patent is extended or adjusted under 35 U.S.C. 154(b) by 0 days.

(21) Appl. No.: 17/297,714

(22) PCT Filed: Jun. 29, 2020

(86) PCT No.: PCT/EP2020/068280
§ 371 (c)(1),
(2) Date: May 27, 2021

(87) PCT Pub. No.: WO2021/001320
PCT Pub. Date: Jan. 7, 2021

(65) Prior Publication Data
US 2022/0042581 A1 Feb. 10, 2022

(30) Foreign Application Priority Data
Jul. 3, 2019 (DE) ...................... 10 2019 004 690.0

(51) Int. Cl.
*F16H 25/20* (2006.01)
(52) U.S. Cl.
CPC ..... *F16H 25/20* (2013.01); *F16H 2025/2068* (2013.01); *F16H 2025/2081* (2013.01)

(58) Field of Classification Search
CPC ............ F16H 25/20; F16H 2025/2068; F16H 2025/2081
See application file for complete search history.

(56) References Cited

U.S. PATENT DOCUMENTS

| 4,563,908 A | 1/1986 | Shube |
| 10,968,584 B1 * | 4/2021 | Gardner ............. F16H 25/2454 |

(Continued)

FOREIGN PATENT DOCUMENTS

| DE | 102 48 616 | 5/2004 |
| DE | 10 2006 041 660 | 3/2008 |

(Continued)

OTHER PUBLICATIONS

International Search Report (ISR) dated Sep. 30, 2020 in International (PCT) Application No. PCT/EP2020/068280.

*Primary Examiner* — David M Fenstermacher
(74) *Attorney, Agent, or Firm* — Wenderoth, Lind & Ponack. L.L.P.

(57) ABSTRACT

A linear drive system has an actuator (10), which can be moved in a translatory manner by an electric drive (12) and which is coupled to a mechanical energy storage (16) in the form of a spring (32). In the event of a loss of energy at the electric drive (12) or in an emergency operation, the actuator (10) travels to a predeterminable position and in so doing exerts an actuating force. One free end of the spring (32) is supported at the free end of the spindle housing (20), and the other free end of the spring (32) is supported at a closing part (36) of the actuator (10) or at the actuator (10) itself and is tensioned in every travel position of the actuator (10).

8 Claims, 1 Drawing Sheet

(56) References Cited

U.S. PATENT DOCUMENTS

| | | |
|---|---|---|
| 2003/0089826 A1 | 5/2003 | Barba |
| 2004/0056153 A1 | 3/2004 | Barba |
| 2006/0138281 A1 | 6/2006 | Barba |
| 2016/0084333 A1* | 3/2016 | Adoline ............... F16F 15/03 |
| | | 267/140.2 |
| 2017/0051814 A1* | 2/2017 | Spyche, Jr. ........... B60N 2/929 |
| 2017/0146147 A1* | 5/2017 | Been ................. F16H 25/20 |
| 2018/0259050 A1* | 9/2018 | Gnebner .............. F16H 48/34 |
| 2020/0088244 A1* | 3/2020 | Ryba ................ H02K 11/215 |
| 2020/0141475 A1* | 5/2020 | Aramoto ............ F16H 25/2238 |
| 2020/0300325 A1* | 9/2020 | Vine ................. G05D 15/01 |
| 2020/0340595 A1* | 10/2020 | McEvoy .............. F16K 31/047 |
| 2021/0270075 A1* | 9/2021 | Sakiyama ............. H02K 7/06 |
| 2021/0332873 A1* | 10/2021 | Blesener ............. H02K 11/215 |
| 2022/0042581 A1* | 2/2022 | Krämer .............. F16H 25/20 |

FOREIGN PATENT DOCUMENTS

| | | |
|---|---|---|
| DE | 20 2008 016 928 | 6/2010 |
| DE | 11 2008 003 498 | 10/2010 |
| DE | 20 2014 104 735 | 4/2015 |
| DE | 10 2016 226 111 | 6/2018 |
| EP | 1 310 424 | 5/2003 |
| WO | 2011/130863 | 10/2011 |

* cited by examiner

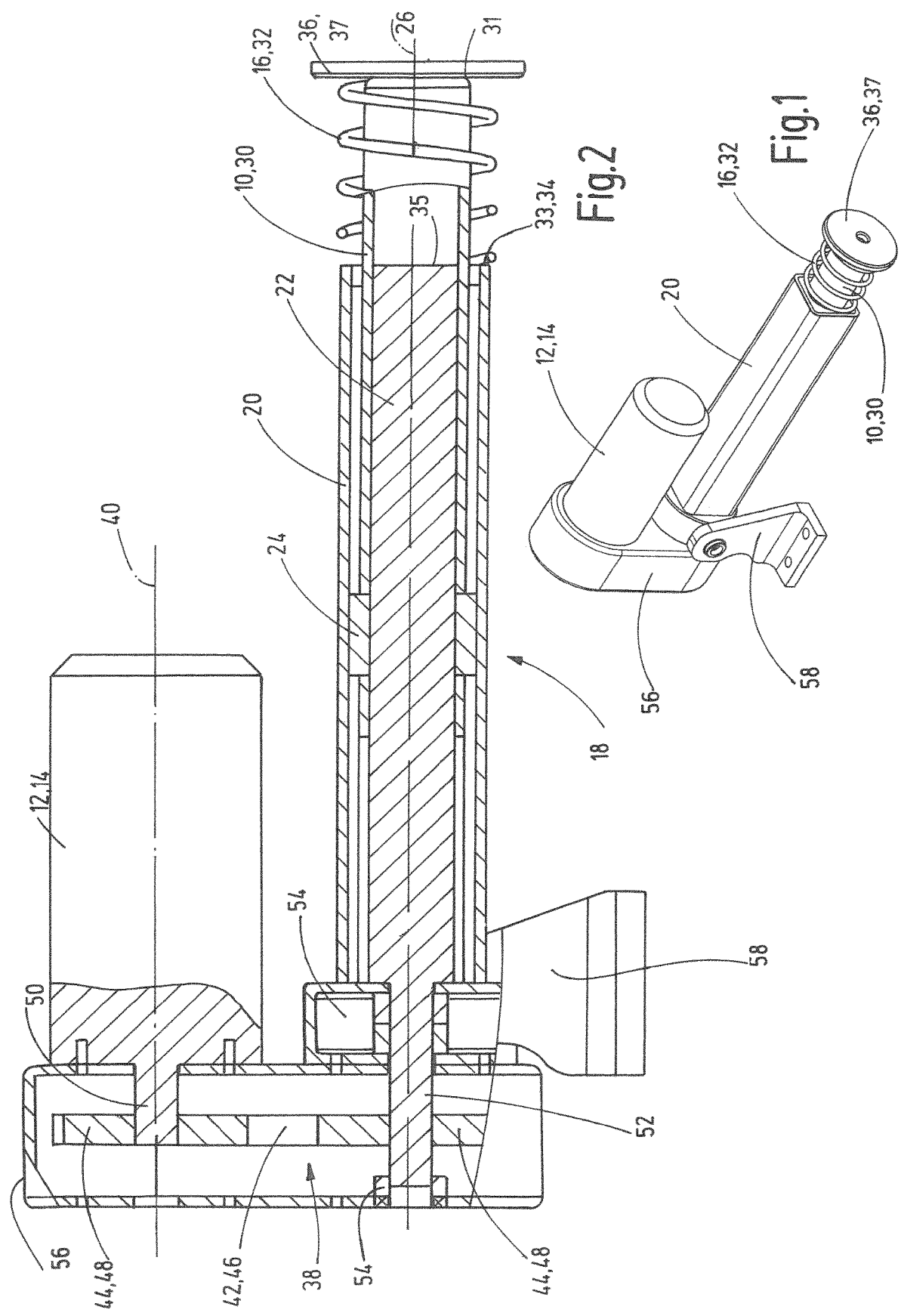

LINEAR DRIVE SYSTEM

FIELD OF THE INVENTION

The invention relates to a linear drive system having an actuator that can be moved in a translatory manner by an electric drive and that is coupled to a mechanical energy storage in the form of a spring. In the event of a loss of energy at the electric drive or in an emergency operation, the actuator travels to a predeterminable position and in so doing exerts an actuating force. The electric drive can be used to control a spindle drive moving the actuator in a translatory manner. The spindle drive has a threaded spindle rotatably guided in a spindle housing. The threaded spindle interacts with the actuator for the actuator's motion via an adjustment nut in engagement with the threaded spindle. The adjustment nut is non-rotatable, but can be moved in a translatory manner in the spindle housing. The actuator has a cylindrical tube, which, in each of its travel positions, is partially guided in the spindle housing via the adjustment nut. The free end of the cylindrical tube projects out of the spindle housing.

BACKGROUND OF THE INVENTION

From DE 20 2014 104 735 U1, an electric cylinder is known as a linear drive system, comprising a linear actuator and an electric motor, connected to the actuator, for driving the actuator. The actuator comprises a housing, in which a translatory movable piston rod is mounted. The housing comprises a rear head assembly, closer to and connected to the electric motor, an intermediate element or a sleeve, and a front head assembly, spaced further apart from the electric motor. At the head assembly, the tip of the piston rod exits from the housing. A spindle drive, comprising a spindle and a spindle nut, is disposed between the electric motor and the piston rod. Accordingly, in the known solution, the spindle drive converts the rotary motion of the electric motor into a linear motion.

WO 2011/130863 A2 shows a linear drive system having an effective hybrid cylinder, which can be driven by an electric motor and which has a hollow spindle and a hollow-bored piston rod as an actuator. The piston rod is arranged such that it can be moved linearly on the hollow spindle. A gas spring is integrated into the effective hybrid cylinder, one end of which gas spring is supported by a base bearing of the hollow spindle and the other end is supported by the piston rod.

The gas spring serves as a supporting element for raising the thrust of the effective hybrid cylinder without changing the overall mechanics of the electric cylinder and, at the same time, can perform an emergency function, in which the piston rod is moved to a predefinable "homing" position and held there by force in the event of a failure of the system, for example in the event of a power failure.

With the known solution, gas losses can occur in relation to the gas spring, which changes its spring characteristics, and the refilling of the operating medium in the form of the working gas during maintenance work results in the shut-down of the assigned system and generates related effort. Because the working gas used in the gas spring is a compressible medium, the system reacts to changes in ambient temperature, which also results in a change in the spring characteristics, which can affect overall operational reliability.

SUMMARY OF THE INVENTION

Based on this state of the art, the invention addresses the problem of further improving the known linear drives.

A linear drive system according to the invention basically solves this problem.

According to the invention, one free end of the spring is supported at the free end of the spindle housing, and the other free end of the spring is supported at a closing part of the actuator or at the actuator itself and is tensioned in every travel position of the actuator. A linear drive system is created, which performs its function without malfunction even in long-term operation and independent of any changes in the ambient conditions, such as temperature. By using a mechanical energy storage instead of a gas accumulator, a purely mechanical solution has been created that basically requires no additional maintenance for its function, such as refilling the working gas in the case of the known gas spring. Because the spring for controlling the actuator is located outside the components of the linear drive system, that can be moved in a translatory manner relative to one another, a particularly slim drive conception is achieved, in which solely the adjustment nut is located in a coaxial annular gap between the spindle housing and the actuator. Preferably, the closing part is projectingly arranged on the free end of the actuator.

Basically, the linear drive system according to the invention is intended for controlling or actuating a force transducer, for instance in the form of a valve or a fitting, which has to be controlled in terms of position or force each. In an emergency, where a loss of mains supply for the electric drive can be assumed, the force transducer has to be moved to a certain safe position and/or with a certain holding force such that, for instance, a pressurized fluid flow to a consumer is interrupted. This safety state has to be attained within a predefined time, which is short and preferably in the range of a few tenths of a second.

In the linear actuator system according to the invention, the mechanical energy storage is the spring, one free end of which is supported at the spindle housing and the other free end of which is supported at the closing part of the actuator or on the actuator itself and is tensioned in any travel position of the actuator. Preferably, this spring is designed as a spiral or disc spring, which is permanently tensioned. In normal operation the electric cylinder works with or against this spring without changing its overall mechanics. Generally, two cases have to be differentiated:

a) In an emergency, the actuator is to be extended to the maximum. In this case, the mechanical energy storage in the form of the spring always has a "pushing" effect on the force transducer and, accordingly, the spindle drive of the electric cylinder always has to apply a pulling force.

b) In an emergency, the actuator is to be retracted to the maximum. Then the mechanical energy storage in the form of the spring always has a "pulling" effect on the force transducer and, accordingly, the spindle drive of the electric cylinder always has to apply a pushing force.

The mechanical energy storage in the form of the spring can therefore be used to cover an emergency, in particular in the form of a power failure. In this case, the spring pulls or pushes the actuator into the relevant position, which causes the spindle of the spindle drive to rotate and, simultaneously, the rotor of the coupled electric drive to rotate. If the drive control or the motor control is appropriately designed, there will then be no current flow in the coils of the stator of the motor, and thus, no unwanted braking effect during the linear motion because the motor is in generator mode then. The desired emergency position with a matching power stroke can be approached without obstacle. Instead of the permanent coupling preferably provided here, it is also possible to decouple the electric drive from the spindle drive in a defined manner in an emergency, for instance using a suitable coupling. As soon as the addressed emergency, e.g., because of a power failure, has been resolved, the control for normal operation can be resumed directly or after a suitable homing run with the actuator via the actuator drive.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are in principal and are not to scale:

FIG. 1 is a perspective view of a linear drive system according an exemplary embodiment of the invention; and FIG. 2 is a side view partially in section of the linear drive system according to FIG. 1.

DETAILED DESCRIPTION OF THE INVENTION

Because of their easy integrability and freedom from maintenance, electric cylinders are often used to implement linear motions. In these cylinders, a screw drive is used to convert a rotary motion of the drive shaft of an electric drive into a linear motion of an actuator. Such electric cylinders are known from the prior art, for instance from DE 20 2014 104 735 U1.

FIG. 1 shows a linear drive system according to the invention with an actuator 10, which can be moved in a translatory manner by an electric drive 12 in the form of an electric motor 14. The actuator 10 is coupled to a mechanical energy storage device 16 in such a way that in the event of a loss of energy at the electric actuator 12, i.e., in an emergency mode, the actuator 10 travels to a predeterminable position and in so doing exerts an actuating force. For this purpose, the electric drive 12 can be used to control a spindle drive 18 moving the actuator 10 in a translatory manner.

The spindle drive 18 has a threaded spindle 22 rotatably guided in a spindle housing 20. The spindle 22 interacts via an adjustment nut 24 in engagement therewith with the actuator 10 for the actuator's motion in the direction of a longitudinal axis 26 of the threaded spindle 22. The adjustment nut 24 is guided in the spindle housing 20 so as to be non-rotatable about the longitudinal axis 26, but movable in a translatory manner along the longitudinal axis 26. To do so, the spindle housing 20 is hollow and has a non-rotationally symmetric, in particular a rectangular, preferably square, internal cross-section, in particular having rounded edges. The outer cross-section of the adjustment nut 24 largely matches the inner cross-section of the spindle housing 20 such that the adjustment nut 24 is guided non-rotatably in the spindle housing 20. The threaded spindle 22 is formed as a cylindrical rod having threads on its outer periphery which engage with threads on the inner periphery of the adjustment nut 24. The actuator 10 has a cylindrical tube 30 that is guided via the adjustment nut 24 in a non-rotatable manner. In each of its travel positions, the cylindrical tube 30 is partially disposed inside the spindle housing 20 and partially its free end 31 protrudes from the spindle housing 20, the free end 33 of which is flush with the free end 35 of the threaded spindle 22.

The mechanical energy storage 16 is formed as a spiral compression spring 32. The one free end of spring 32 rests against the free end face 34 of the spindle housing 20, The other free end of spring 32 rests against an end part 36, which is arranged transversely to the longitudinal axis 26 of the actuator 10, closes the free end 31 of the actuator 10 and is formed as a circular disc 37. The radius of disc 37 is larger than the radius of the cylinder tube 30 of the actuator 10. At least during normal operation, the compression spring 32 is tensioned in every travel position of the actuator 10. A disc spring or a disc spring assembly (both not shown) can also be used instead of the coil spring 32 shown in the Figures.

In normal operation, in which the electric drive 12 is supplied with sufficient electric current, the spindle drive 18 works against the compression spring 32 when retracting into the spindle housing 20. Under the action of the electric drive 12, spindle drive 18 applies, in relation to the stationary spindle housing 20, a pulling force to the actuator 10 or is supported by the compression spring 32 when extending from the spindle housing 20, thus applying in relation to the stationary spindle housing 20 a pulling force to the actuator 10 under the action of the electric drive 12. The absolute value of that pulling force is smaller. In normal operation, the compression spring 32 is permanently tensioned in every travel position of the actuator 10.

In emergency operation, on the other hand, in which the electric actuator 12 experiences a power failure, the electric drive 12 no longer acts on the actuator 10, so that the actuator 10 extends from the spindle housing 20 by the pressurized disc 37 under the action of the spring force of the relaxing compression spring 32. The spindle drive 18 can be used to retract or extend the electric linear drive to the maximum in an "extended" normal mode until all coils of the compression spring 32 are in full contact or until the adjustment nut 24 hits the end stop at the free end 33 of the spindle housing 20. In the solution according to the invention, however, the maximum free inward and outward motions of the actuator 10 of the spindle drive 18 are selected in such a way that the compression spring 32 retains its inherent tension to such an extent that the emergency actuation of a force transducer (not shown), such as a valve, which is connected to or can be actuated by the system, is ensured.

In an exemplary embodiment (not shown in the figures), the spring 32 can also be formed as a tension spring, with one free end firmly connected to the spindle housing 20 and the other free end of firmly connected to the end part 36 of the actuator 10. In normal operation, the spindle drive 18 is then supported in the opposite direction, as described above for the compression spring 32, by the tension spring when retracting into the spindle housing 20 and working against the spring's tension force when extending out of the spindle housing 20. In every travel position of the actuator 10 in normal operation, the tension spring is also permanently kept under inherent stress. In emergency operation, the effect of the electric actuator 12 on the actuator 10 ceases again, such that the actuator 10 moves into the spindle housing 20 under the force of the tension spring. In this case, the force transducer has to have a different "fail-safe" design than in the case with the compression spring 32, where the valve is pressed into its fluid-locking position in an emergency.

While the compression spring 32 pushes the actuator 10 or the tension spring pulls the actuator 10 into its predetermined actuating position for the force transducer, the rotor of the electric drive 12, which is de-energized in an emergency, is passively driven by a rotation of the threaded spindle 22 in the way of a generator, but this does not inhibit the motion of the actuator 10.

The electric drive 12 is in operative connection with the threaded spindle 22 via a belt drive 38. The further longitudinal axis 40 of the electric drive 12 is arranged in parallel to the longitudinal axis 26 of the spindle drive 18. Instead of a belt drive 38 having a drive belt 42, which is wrapped around two friction pulleys 44 (driving and driven pulleys) or as a toothed belt 46, which is wrapped around two toothed pulleys 48, a gear drive having meshing toothed wheels (not shown) can also be used, omitting the belt 42.

The rotor or output shaft 50 of the electric motor 14 extends parallel to the threaded spindle 22, and its drive shaft 52 is guided at the ends in bearing points 54 of the usual construction. However, the motor 14 and the threaded spindle 22 can also be arranged in a U- or L-shape relative to each other. All transmission components for the drive shaft 52, including the drive shaft, are guided in a console 56, closed off from the outside. Console 56 can be set up on the floor or a machine part by a foot part 58 in a pivotable manner.

Preferably, it is provided that in emergency operation the actuator 10 acts on a force transducer (not shown in the figures), such as a valve or a fitting. The force transducer is brought into a predeterminable position within a predeterminable time and, if necessary, is held in this position by an end stop. For this purpose, the actuator 10 can be firmly connected to the force transducer, if necessary.

Preferably, a frequency converter (not shown in the figures) is provided and operatively connected to the electric drive 12. An open-loop or closed-loop controls the torque and/or the rotation speed of the electric drive 12. The drive 12 is formed as a synchronous or asynchronous electric motor 14, which can be controlled via an inverter. In addition, a controller (not shown in the figures) is provided to control the frequency converter.

In a position controlling system, the input end of the controller for determining the position of an adjusting part of the force transducer can be electrically connected to an encoder or displacement measuring system that detects the travel distance of the adjusting part and/or the actuator 10. It is also conceivable that the controller is connected to a sensor for detecting the position and/or a sensor for detecting the rotation speed and/or the rotation angle of the electric motor 14. Alternatively, the position and/or the rotation speed of the motor can also be estimated with the aid of a stored motor model. Depending on the position and/or the rotation speed of the motor 14 in addition to the thread pitch of the threaded spindle 22, the controller can control the travel position of the adjustment part and the actuator 10 of the linear drive accordingly via the associated controlling system and thus also without a displacement encoder.

In a force controlling system, the input side of the controller may be connected to a load cell or torque measuring bolt for determining the force exerted by the actuator 10. Alternatively, the torque of the motor 14 can be estimated with the aid of the motor model. Depending on the torque and the thread pitch of the threaded spindle 22, the force can be determined, and the force exerted by the actuator 10 is used to control the linear drive.

The frequency converter preferably has insulated gate bipolar transistors (IGBTs), which are designed to be self-blocking. In a non-controlled state, for instance in the event of a power failure, they are open in the sense of a "fail-safe" solution, which helps to ensure that there is no undesirable braking effect of the linear motion due to an electric motor 14 in generator operation. The travel position of the actuator 10, which can be specified in emergency operation, can be approached unhampered.

While one embodiment has been chosen to illustrate the invention, it will be understood by those skilled in the art that various changes and modifications can be made therein without departing from the scope of the invention as defined in the claims.

The invention claimed is:

1. A linear drive system, comprising:
    an actuator movable in a translatory manner by an electric drive coupled to the actuator;
    a mechanical energy storage in the form of a spring being coupled to the actuator such that, in the event of a loss of energy at the electric drive or in an emergency operation, the actuator travels to a predeterminable position and exerts an actuating force;
    a spindle drive being controlled by the electric drive and moving the actuator in a translatory manner, the spindle drive having a threaded spindle rotatably guided in a spindle housing, the threaded spindle interacting with the actuator for motion of the actuator via an adjustment nut in engagement with the threaded spindle, the adjustment nut being non-rotatably guided in the spindle housing for translatory movement;
    a cylindrical tube of the actuator being partially guided in each of travel positions thereof in the spindle housing via the adjustment nut, a free end of the cylinder tube projecting out of the spindle housing; and
    one free end of the spring being supported at the free end of the spindle housing and the other free end of the spring being supported on at least one of a closing part of the actuator or on the actuator and being tensioned in every travel position of the actuator.

2. The linear drive system according to claim 1 wherein the closing part projects on a free end of the actuator.

3. The linear drive system according to claim 1 wherein the actuator has a cylindrical tube partially guided in the spindle housing via the adjustment nut in each of the travel positions of the actuator.

4. The linear drive system according to claim 1 wherein
    in emergency operation, the actuator at least one of extends or retracts to a maximum with the spring acting permanently on the actuator in a pushing or pulling manner, respectively: and
    in normal operation, the spindle drive uses the electric drive to apply at least one of a pulling or pushing force to the actuator relative to the spindle housing that is stationary.

5. The linear drive system according to claim 1 wherein in emergency operation, the spring at least one of pulls or pushes the actuator into a predetermined position thereof, resulting in a passive rotation of the threaded spindle and a rotor of the electric drive coupled thereto.

6. The linear drive system according to claim 1 wherein the electric drive is operatively connected to the threaded spindle via at least one of a transmission or a belt drive.

7. The linear drive system according to claim 1 wherein a longitudinal axis of the electric drive is parallel to longitudinal axis of the spindle drive.

8. The linear drive system according to claim 1 wherein the electric actuator and the spindle drive are interconnected via a connecting console; and
    the actuator acts on a force transducer of a valve or a fitting, at least in emergency operation.

* * * * *